United States Patent
Anderson

(12) 
(10) Patent No.: US 6,691,644 B1
(45) Date of Patent: Feb. 17, 2004

(54) SUPPORT FRAME AND PEN ACCESSORY FOR ANIMAL SHELTER

(76) Inventor: John F. Anderson, 31994 County 24 Blvd., Cannon Falls, MN (US) 55009

(*) Notice: Subject to any disclaimer, the term of this patent is extended or adjusted under 35 U.S.C. 154(b) by 0 days.

(21) Appl. No.: 10/146,579

(22) Filed: May 14, 2002

Related U.S. Application Data

(60) Provisional application No. 60/373,035, filed on Apr. 15, 2002.

(51) Int. Cl.[7] .................................................. A01K 1/00
(52) U.S. Cl. ........................ 119/502; 119/513; 119/514; 119/515
(58) Field of Search .......................... 119/508, 513–515, 119/415, 424, 452, 752; 52/64; 256/1, 65.11, 67

(56) References Cited

U.S. PATENT DOCUMENTS

| | | | | |
|---|---|---|---|---|
| 45,080 A | * | 11/1864 | Sage et al. .................... 119/498 |
| 2,678,629 A | * | 5/1954 | Meyer .......................... 119/514 |
| 2,835,223 A | * | 5/1958 | Erickson ....................... 119/502 |
| 4,735,173 A | * | 4/1988 | Dubreuil ....................... 119/512 |
| 5,218,925 A | * | 6/1993 | Anderson ...................... 119/501 |

* cited by examiner

Primary Examiner—Charles T. Jordan
Assistant Examiner—Bret Hayes
(74) Attorney, Agent, or Firm—Westman, Champlin & Kelly, P.A.

(57) ABSTRACT

A pen is provided for the exterior of an animal shelter house or calf hutch, and is mounted onto an adjustable universal frame that fits on the exterior of the animal shelter house and is secured to the house. The frame is adjustable in width using cross members that overlap and are secured together in an adjusted position. The frame provides vertically extending guides that form a track for receiving side walls of the pen so that the pen can be slid longitudinally of the animal shelter house from an extended position which provides an exercise area pen to a retracted position wherein a forward panel of the pen will close the door or opening in the end of the animal shelter house. The end wall of the pen supports a suitable holder for feeding buckets for the calf or young animal.

10 Claims, 6 Drawing Sheets

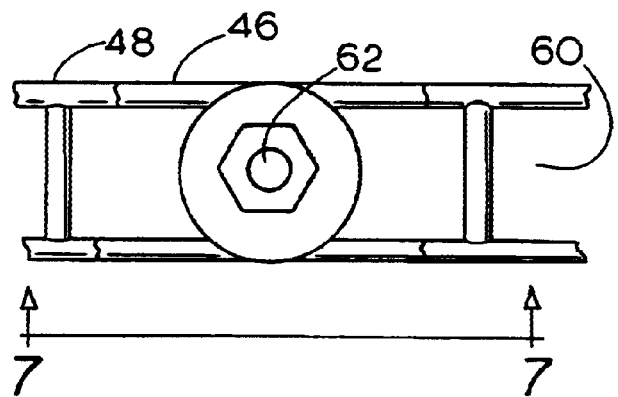
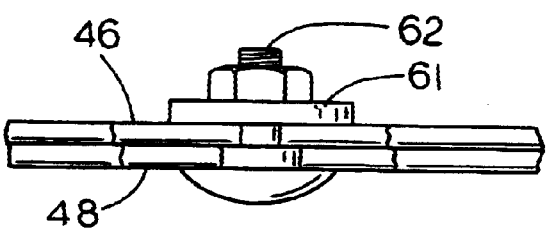
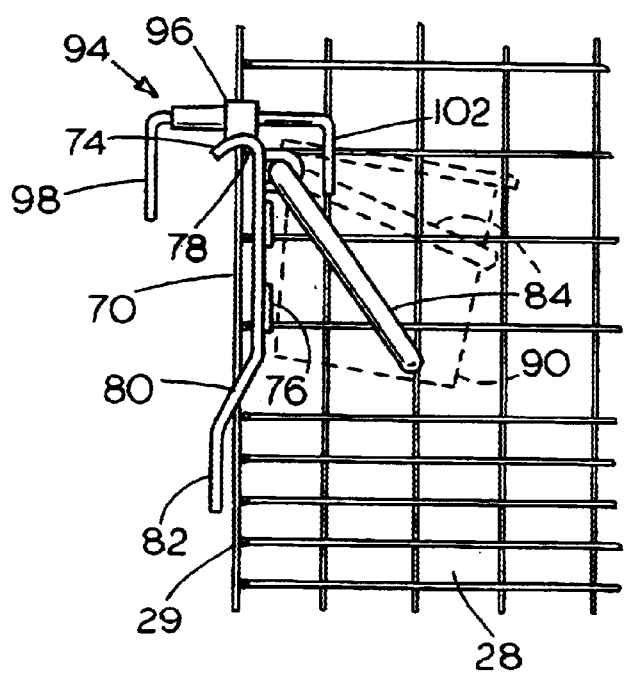

SUPPORT FRAME AND PEN ACCESSORY FOR ANIMAL SHELTER

The present application is based on and claims the benefit of U.S. Provisional Patent Application Serial No. 60/373,035, filed Apr. 15, 2002, the content of which is hereby incorporated by reference in its entirety.

BACKGROUND OF THE INVENTION

The present invention relates to an exterior pen and a supporting frame that can be used with animal shelters commonly known as "calf hutches" which permits adding a small pen for animal exercise without substantial modification to the calf hutch itself. The improvement includes a unique pail holder for holding pails for milk and feed for a calf, that will move with the pen and when the calf is to be contained in the hutch, the pails will be positioned inside the open door of the hutch.

In the prior art, various animal shelters have been advanced, including U.S. Pat. No. 5,218,925, which shows an animal shelter that has a pen enclosure on the exterior. The pen enclosure slides along guides along the side of the animal shelter, between an extended position where it provides an exercise area, and a closed position where the young animal or calf is contained within the shelter. This arrangement works well, and it has been found that retro fitting existing shelters with pens is desirable. Using a universal frame for holding the pen on a number of different types of houses is also desirable.

SUMMARY OF THE INVENTION

The present invention relates to a pen for use with small animal shelters, or calf hutches, that includes an exterior frame that can be mounted directly to the animal shelter, either with a specifically designed shelter or for a retro fit of an existing shelter, that provides a retainer support and sliding guide for a wire mesh three panel pen formed in a normal manner and of suitable size for providing an exercise area for a calf or other small animal.

The frame mounts over the animal shelter or house on the exterior, and it is secured to the housing walls. The frame has upright guides along the sides and top cross member that permit adjusting the width, and the frame can also be adjustable in height, if desired. The guides on each side of the shelter provide guide slots for the side panels or walls of the relatively rigid wire mesh pen. The retracted position of the pen positions an end pen panel to cover the open door of the animal shelter. When retracted, the sliding side walls of the pen are supported on suitable support stirrups mounted on each side at the rear of the hutch.

The end panel of the pen also can support a door panel, as shown in U.S. Pat. No. 5,218,925, if desired, or as shown herein, a support for feed and milk pails are mounted on the mesh end wall of the wire mesh pen. The frame will provide for secure, readily usable supports whether the pen is extended or is retracted to keep the animal inside the shelter or house.

The pen is readily adapted to various types of animal shelters including ones which have a sloping front, merely by adjusting the supports for the pen accordingly.

BRIEF DESCRIPTION OF THE DRAWINGS

FIG. 6 is an enlarged fragmentary top view of the overlapping adjustable sections of the cross members of the frame;

FIG. 7 is a fragmentary side view of the cross member of FIG. 6, taken on line 7—7 in FIG. 6;

FIG. 8 is a side view of the pail holder bail mounted onto a front panel of the pen.

DETAILED DESCRIPTION OF THE PREFERRED EMBODIMENTS

Figure 1:
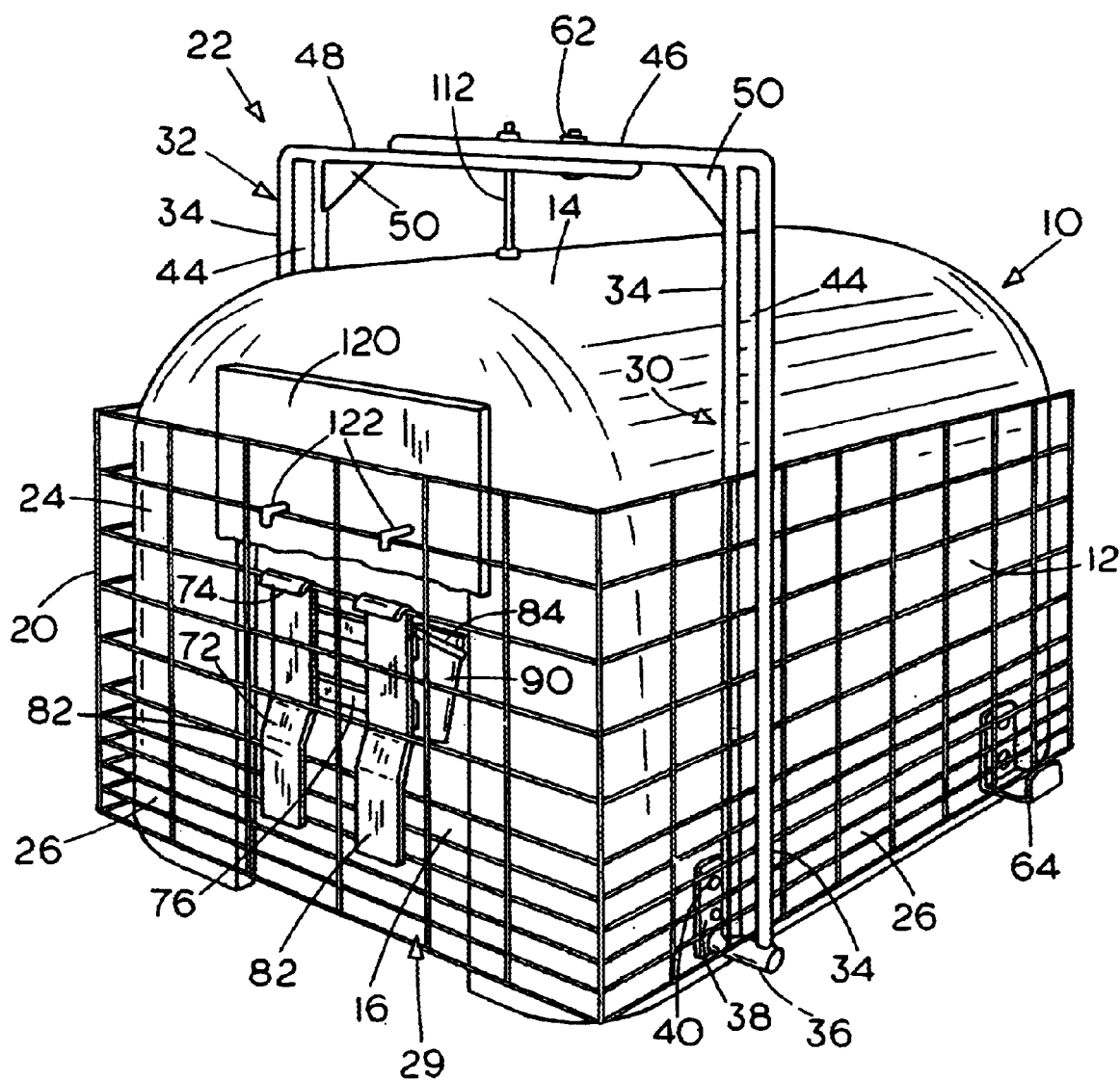
FIG. 1 is a perspective view of a typical animal shelter having a pen and supporting frame made according to the present invention and installed thereon.
Figure 3:
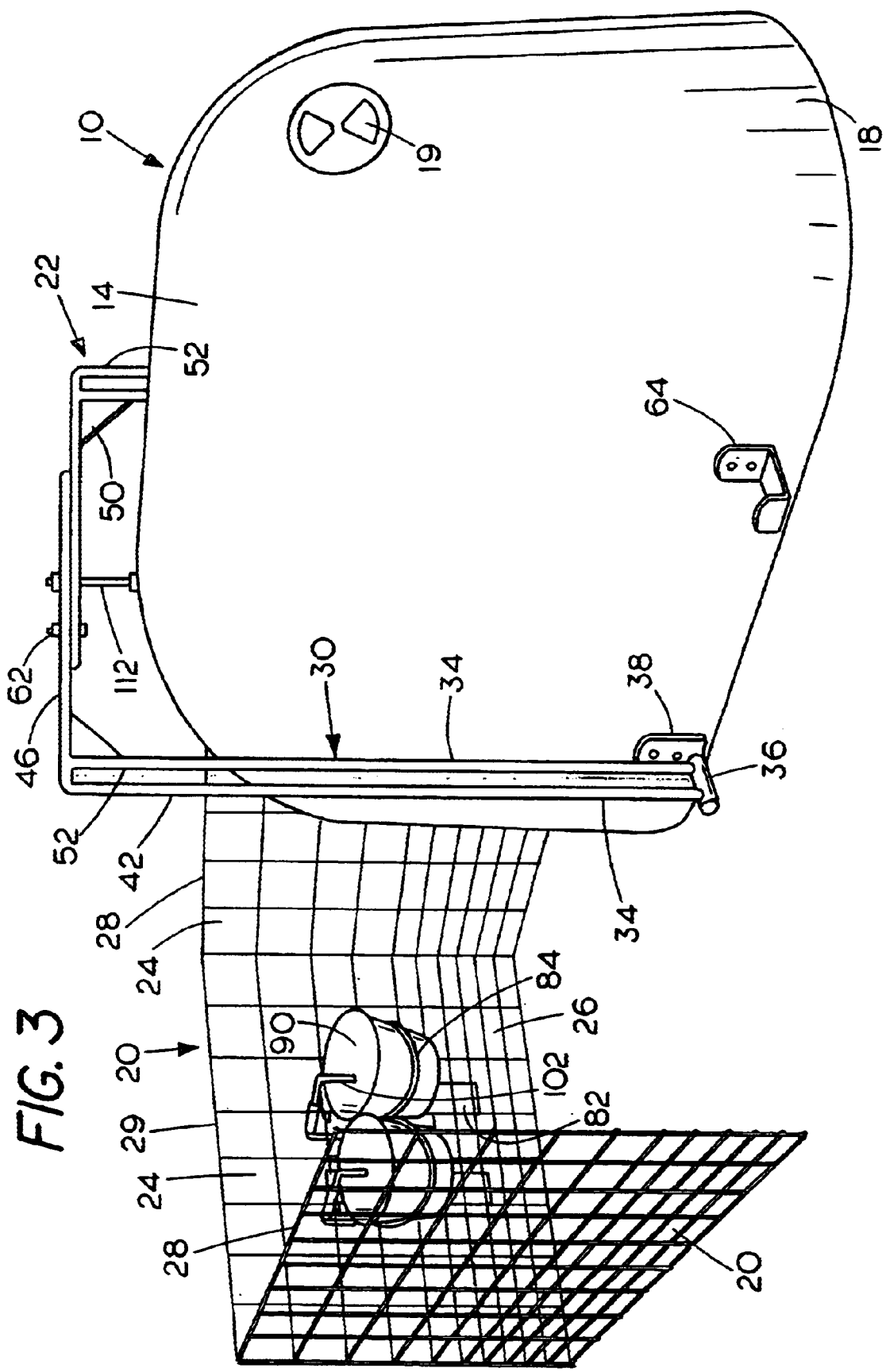
FIG. 3 is a rear perspective view of the animal shelter showing the details of the frame and a support stirrup, and showing a side wall released from the mounting frame.

FIG. 1 shows a typical animal shelter house or calf hutch 10 that is a generally molded plastic housing, that has side walls 12, a top or roof 14, and a calf door opening 16 at one end. The opposite end of the shelter house or calf hutch 10 is closed in a conventional manner, and as shown in FIG. 3, the rear wall or opposite end 18 is provided with a vent 19 in a normal manner. The vent 19 can be placed at any desired location.

FIG. 1 illustrates a wire mesh pen 20 that is supported on a frame 22 made according to the present invention that is secured to the shelter house 10. The pen 20, as seen, can be made of standard, relatively large opening wire mesh, that is relatively rigid, and is commercially available. As shown, the openings 24 in the wire mesh are larger near the top than the openings 26 in the wire mesh near the bottom. This helps control situations where small animals may try to stick their head through the openings. The smaller openings prevent that.

The pen 20 includes first and second side walls 28, joined to an end wall 30. The side walls 28 are spaced apart a desired distance, depending on the width of the animal shelter house 10. To support the pen 20 on the animal shelter, the frame 22 that is shown includes first and second upright frame guide and retainer sections 30 and 32 on the sides of the house. These upright frame guide sections are identical, except one is right hand and one is left hand, and each of them includes a pair of upright posts 34 that are held together with a lower pipe cross member 36, that extends laterally and has a flange 38 on one end. The flange on each guide section extends vertically, as shown, and is secured with a suitable fastener or bolt 40 to the respective side wall 12 of the animal shelter house 10.

The outer upright posts 34 of each of the frame guides 30 and 32 are bent to form upper cross members that tie the posts on each side together so that they are spaced apart to provide a guide slot 44 on each side of the animal shelter house 10.

The top bent over members are secured to suitable top frame cross members 46 and 48 for supporting the respective frame guide members 30 and 32. The guide member is sufficiently high so the cross members 46 and 48 are raised up to a sufficient height to clear the top or roof 14 of the animal shelter house 10. The cross members 46 and 48 overlap at the center portions of the shelter house 10, and are slidable relative to each other, and as shown in FIGS. 6 and 7, these cross members 46 and 48 are formed as spaced apart rails or straps that define a center slot 60.

The cross members 46 and 48 overlap, as shown in FIG. 7, and are bolted together with a suitable fastener 62. As shown, a carriage bolt can be used as fastener 62, and the square shank of the carriage bolt head will fit into the slot 60 and a washer 61 on the top cross member will permit clamping the fastener 62 to tightly clamp the two cross members 46 and 48 together in a lateral or width adjusted position to accommodate the different widths of calf hutches or shelter houses 10 with which the support frame assembly 22 is used.

Figure 4:
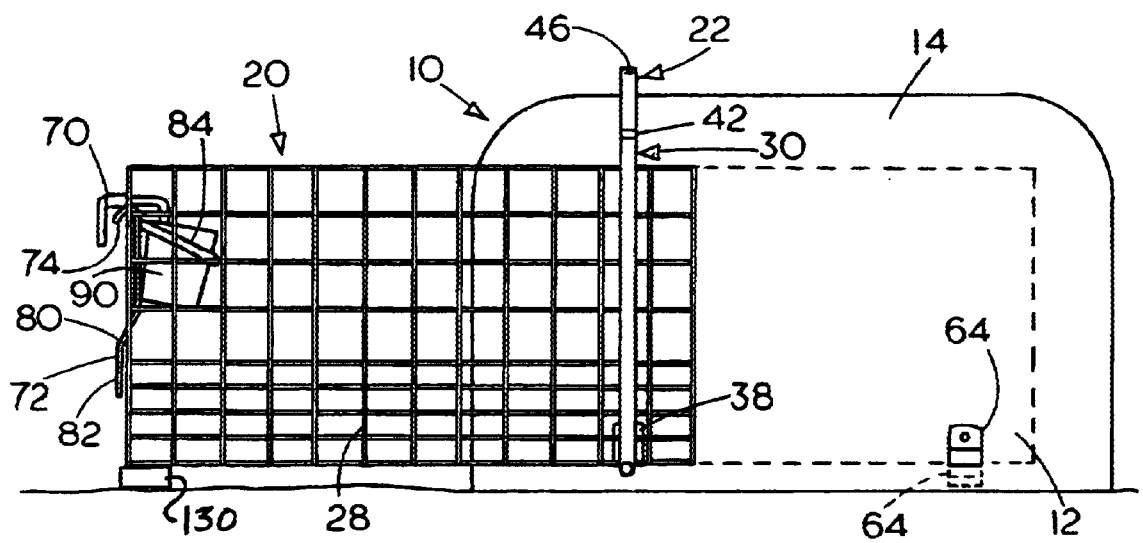
FIG. 4 is a schematic side view of the house, illustrating the frame and a support stirrup at the rear.
Figure 5:
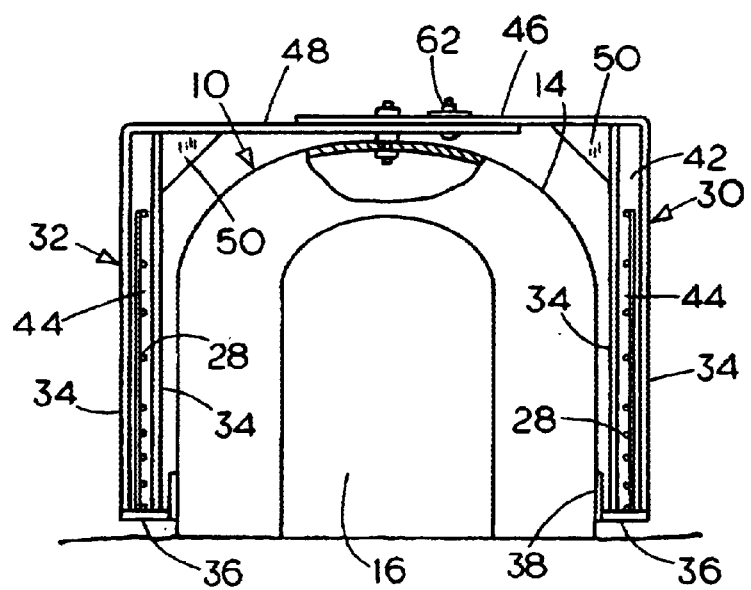
FIG. 5 is a schematic front view of the housing and frame.

Additionally, a stirrup or support 64 is provided on each of the house side walls 12 toward the rear wall, and spaced from the frames 30 and 32 a desired amount so that the stirrups will provide a support for the side panels 28 of the pen when the pen is retracted to its dotted position shown in FIG. 4.

It can be seen that the pen 20 can easily be formed to the desired size, by having a continuous mesh panel that is bent at suitable positions to provide a proper width end wall 29, and then the side walls 28 can slide into the slots 44 of the upright frame side guides 30 and 32. The side walls 28 are supported relative to the frame 22 in slots 44 and held from separating by the upright frame side guides 30 and 32.

In the extended position of the pen 20, it can be seen that an adequate area is provided to the exterior of the door opening 16 for a calf exercise area. The pen 20 can be retracted by lifting the end wall 29 and moving it along the ground while supported on the cross members 36 of the upright frame side guides 30 and 32 which support the lower edges of the side walls 28 of the pen 20. When retracted side walls are supported on stirrups 64. The stirrups 64 and the cross member 36 are raised up from the ground and can be made of pipe so they provide a rounded upper surface for ease of sliding. The pen 20 will slope downwardly when extended and with the end wall 29 resting on the ground, as shown in FIG. 1. The stirrup 64 can be adjusted in height so that the top of the end wall 29 will tilt rearwardly if the front wall of the calf hutch or shelter house 10 is sloped rearwardly. By adjusting the stirrups in the proper position as indicated in dotted lines in FIG. 4, the amount of the rearward tilt of the end wall 29 can be adjusted.

Another feature of the overall system is that the end wall 29 which can be used for supporting a pail holding frame 70, is made so it will hold two pails. The frame 70 has a pair of formed straps 72 that are bent so that they have hooks 74 at the top end thereof, and they are joined together with a pair of cross members 76 (FIGS. 8 and 9) to form the frame 70. The straps 72 are also formed so that the hooks 74 can go over a cross wire or rod 78 of the end wall 29 of the pen, and the lower ends 82 of the strap 72 are bent as at 80 so that these lower ends 82 will pass through an opening in the end wall 29 and be positioned on the exterior of the end wall 29, as shown in FIG. 1, so that they are securely held in place. For holding a pail 90, a pail loop 84 is mounted in a sleeve 86 on the frame 70. The pail loop 84 can be raised and lowered about a horizontal axis. A pail 90 can be dropped in one pail loop 84, and will be held in place as shown in FIG. 1. Two side by side pails 90 are accommodated.

In order to make sure that the animals will not tip the pails out of the loops, or work them out of the loop with their noses, a type of a latch or pail retainer indicated at 94 is included. A sleeve 96 mounts a flat bottom U-shaped latch member 98, with one leg 100 at the exterior of the pen wall 29 and the other leg 102 positioned so that it will drop into the inside of a pail 90 when the pail is held in position in loop 84. The interior leg of the U-shaped member 98 can be pivoted out of the way for installing the pail, and it can be slid in fore and aft direction in sleeve 96, as indicated by the double arrow 104 to slide it out of the way for inserting the pail, but then moved back into position and then dropped down so that the leg 102 is inside the pail to prevent the pail from being pushed up and out of the pail loop. One of the legs 100 or 102 is secured to the base that slides in sleeve 96, after placing the base through the sleeve.

Figure 2:
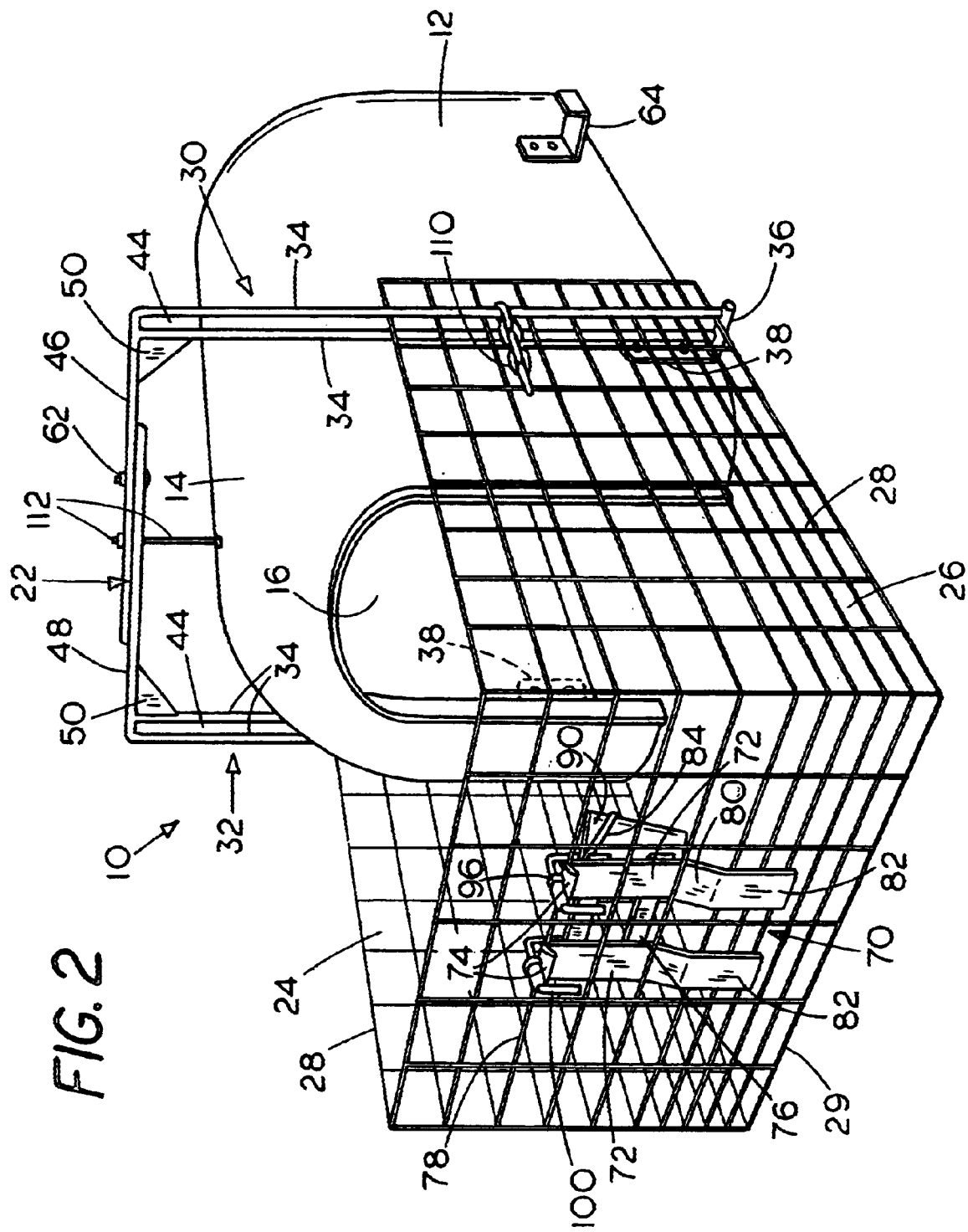
FIG. 2 is a perspective view of the pen extended from the animal shelter.

A safety chain indicated at 110 (FIG. 2) can also be provided between one or both of the side walls or frames 32 and 34 and have a snap or fastener that would snap onto one of the vertical rods or wires of the mesh side walls. The safety chain prevents a calf from pushing the pen forwardly sufficiently far to disengage the side walls from the vertical frame members.

It thus can be seen that the pen support adapts itself easily to a variety of individual animal shelters, and the flanges 38 can be easily bolted into place on the shelter side walls. The frame cross members are also easily adjusted and fastened in place. The frame cross members can be bolted to the roof 14 of the calf hutch with an anchor bolt shown at 112, that can be adjustably threaded to pass through an opening in the roof. The anchor bolt is held in place with washers and nuts on the top and bottom surfaces of the roof, and then passed up into the slot in the cross members and locked in place in a suitable manner. This will stabilize the frame 22 in fore and aft direction, and hold it securely vertically as well.

The door opening 16 of the animal shelter house can be closed by attaching a panel of rigid plastic sheet plywood 120 (shown fragmentally in FIGS. 1) on the end wall 29, for example, with hooks 122 of the pen. When the pen is retracted, the panel will cover the door opening 16. The panel will shield a calf in the animal shelter from wind and cold.

It should be noted that the attachment between the upright frame members 30 and 32, and the cross members can be made in any desired manner, and the cross members can be secured directly to the tops of the rods or pipes that form the upright frames if desired. The frame and pen are easily made, and are easily adapted to a wide range of animal shelter sizes and shapes.

In FIG. 3, one side wall of the pen is folded out from the shelter and thus makes it easy to get a calf into the pen and shelter. A transport trailer, or vehicle can be placed at or backed to the opening and the calf is guided in easily. Also, the supports for the pen permit the pen and shelter to be lifted as a unit with a fork lift or tine equipped loader for cleaning or disinfecting the shelter, or for moving it to another location.

Figure 9:
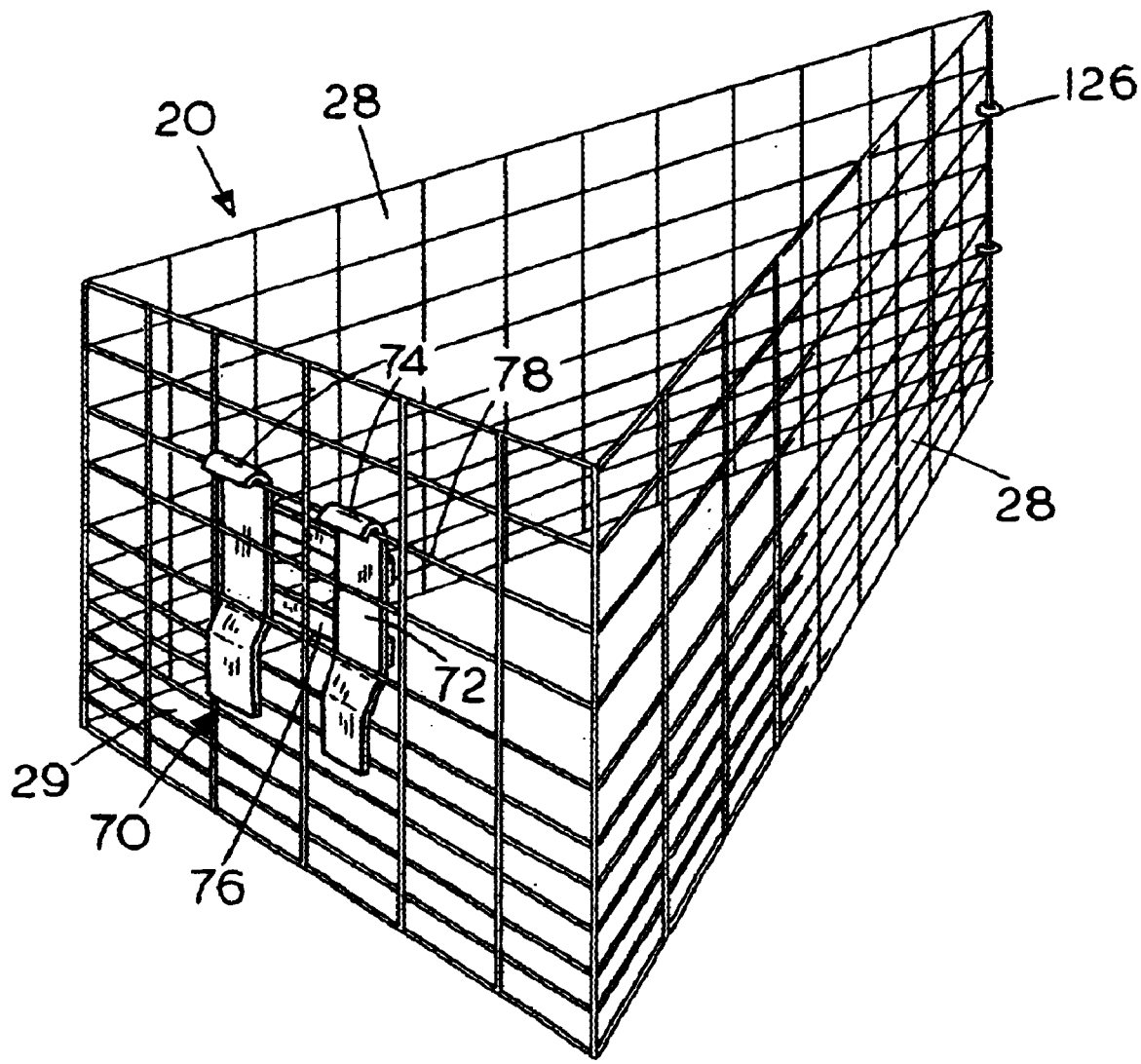
FIG. 9 is a schematic perspective view of the pen removed from the frame and forming an independent enclosure, and showing the pail holder of the present invention.

FIG. 9 shows how the pen can be used to form a separate enclosure, apart from the calf hutch, or shelter to hold a calf while the shelter is cleaned. The side members can be moved so the free ends are adjacent and held together with clips 126, or just wired or snapped together. The mesh pen thus has wide versatility.

In FIG. 4, a support block 130 is shown to support the front end of the pen. This raises the top of the pen to make it more difficult for a calf to jump out, and also keeps the entire bottom wire from freezing down in winter. The block 130 can be a selected length of 2×4 lumber and can extend along the front edge or can be short lengths at the front corners of the pen.

Also, large washers or reinforcing plates are used under the head of bolts that pass through the walls of the animal shelter to reduce the likelihood of damage to the walls.

Although the present invention has been described with reference to preferred embodiments, workers skilled in the art will recognize that changes may be made in form and detail without departing from the spirit and scope of the invention.

What is claimed is:

1. A support structure for a pen on an animal shelter house, comprising a pair of upright members forming guides for receiving side walls of a pen, attachment flanges for securing lower ends of the upright guides to side walls of a pen, and cross members at upper ends of the upright members to span between the upright members, the cross members being secured together at a desired position.

2. The support structure of claim 1, wherein said guides are formed by a pair of upright posts that are spaced apart to provide a vertical space for slidably receiving side walls of said pen.

3. The support structure of claim 1, wherein said cross members are adjustably secured together.

4. The support structure of claim 1, in combination with the pen having side walls slidably received in the guides, and an end wall that extends between the side walls and spans an open end of an animal shelter mounting the upright members, and a pair of stirrups for supporting the side walls mountable onto an animal shelter spaced from the upright members in a direction toward an end opposite from the open end of the animal shelter.

5. A support frame for attaching to an animal shelter house, said frame having first and second side members, each of the side members comprising a pair of upright posts laterally spaced to provide a guide slot for a wire mesh, a bottom support holding the posts of each side member in spaced position, said bottom support having a rounded upper surface, and a top support holding the posts of each side member in position, each of the side members having a laterally extending cross member positioned at a height to clear the animal shelter house on which the support frame is mounted, said cross members being of length to overlap when the side members are positioned on opposite sides of the animal shelter house, the overlapping cross members including means for fixing the cross members together at a location determined by the width of the animal shelter house, and a support flange on each of the side members for supporting the respective side members on an adjacent side wall of the animal shelter house.

6. The support frame of claim 5, wherein said laterally extending cross members have slots therein, and a fastener passing through the slots of the overlapping laterally extending cross members for securing the laterally extending cross members in position.

7. The support frame of claim 5, used in combination with a pen formed of open mesh wire, the pen including pen side walls and a pen end wall, the side walls being of size to fit within the guide slots of the respective side members, and the side walls of the pen being of length to be extended from the animal shelter house to provide an exercise pen for an animal while supported in the guide slots.

8. The support frame of claim 7, and a pail support frame having a pair of upright members, said upright members having hooks thereon to hook over a cross wire of the wire mesh, and the upright members being bent to pass through openings of the wire mesh at a lower portion thereof to be positioned on opposite sides of the wire mesh from upper portions of the upright members.

9. The support frame of claim 8, wherein said pail support comprises a pivoting ring of size to receive a pail, said pivoting ring being pivoted about a horizontal axis adjacent a top of the pail support, the ring being of size to encircle a pail and act under gravity to hold a pail in the ring in position against an inner surface of the wire mesh on which the pail support is hooked.

10. The support frame of claim 9, and a latch arm for holding the pail in the ring in position, said latch arm comprising a shaft rotatably mounted on the pail support, and an arm portion that will extend into the pail held in the ring in one portion thereof, and the arm position being rotatable out of the pail to permit removal or insertion of the pail in the ring.

* * * * *